United States Patent [19]

Seeman

[11] Patent Number: 5,236,242
[45] Date of Patent: Aug. 17, 1993

[54] TRUCK SPOILER SYSTEM
[75] Inventor: Ronald D. Seeman, Lafayette, Calif.
[73] Assignee: Douglas W. Hevenor, Walnut Creek, Calif. ; a part interest
[21] Appl. No.: 935,790
[22] Filed: Aug. 27, 1992
[51] Int. Cl.[5] ............................................. B62D 35/00
[52] U.S. Cl. ............................... 296/180.1; 296/180.5; 296/57.1
[58] Field of Search .............. 296/180.1, 180.2, 180.5, 296/50–53, 56, 57.1, 59, 60, 43

[56] References Cited

U.S. PATENT DOCUMENTS

| | | | |
|---|---|---|---|
| 269,009 | 12/1882 | Chapman | 296/57.1 |
| 1,764,615 | 6/1930 | Edwards | 296/50 |
| 2,246,358 | 6/1941 | Jelinek et al. | 296/56 X |
| 4,406,491 | 9/1983 | Forster | 296/180.3 |
| 4,475,759 | 10/1984 | Wine | 296/180.5 |
| 4,585,265 | 4/1986 | Mader | 296/56 |
| 4,652,035 | 3/1987 | Austin, Jr. | 296/56 X |
| 5,039,154 | 8/1991 | Lewis | 296/100 X |

FOREIGN PATENT DOCUMENTS 4027678 1/1992 Japan ..................... 296/50

Primary Examiner—Dennis H. Pedder
Attorney, Agent, or Firm—Thomas R. Lampe

[57] ABSTRACT

A tail gate of a truck having a body including a transport bed and spaced side walls is selectively alternatively positionable between its normal location and an alternate location. In the alternate location the tail gate is supported and elevated relative to the transport bed and functions as a spoiler affecting air flow during movement of the truck.

8 Claims, 6 Drawing Sheets

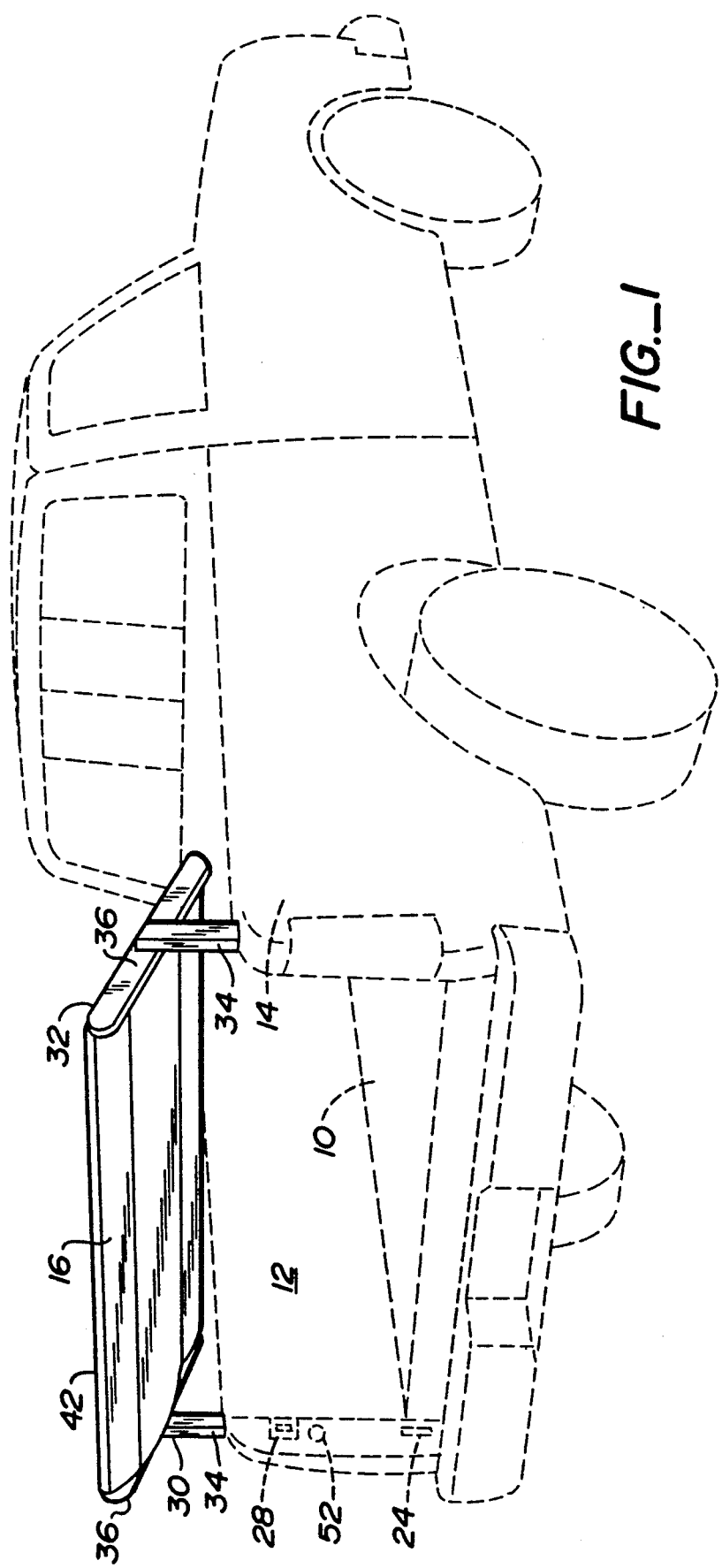
FIG._1

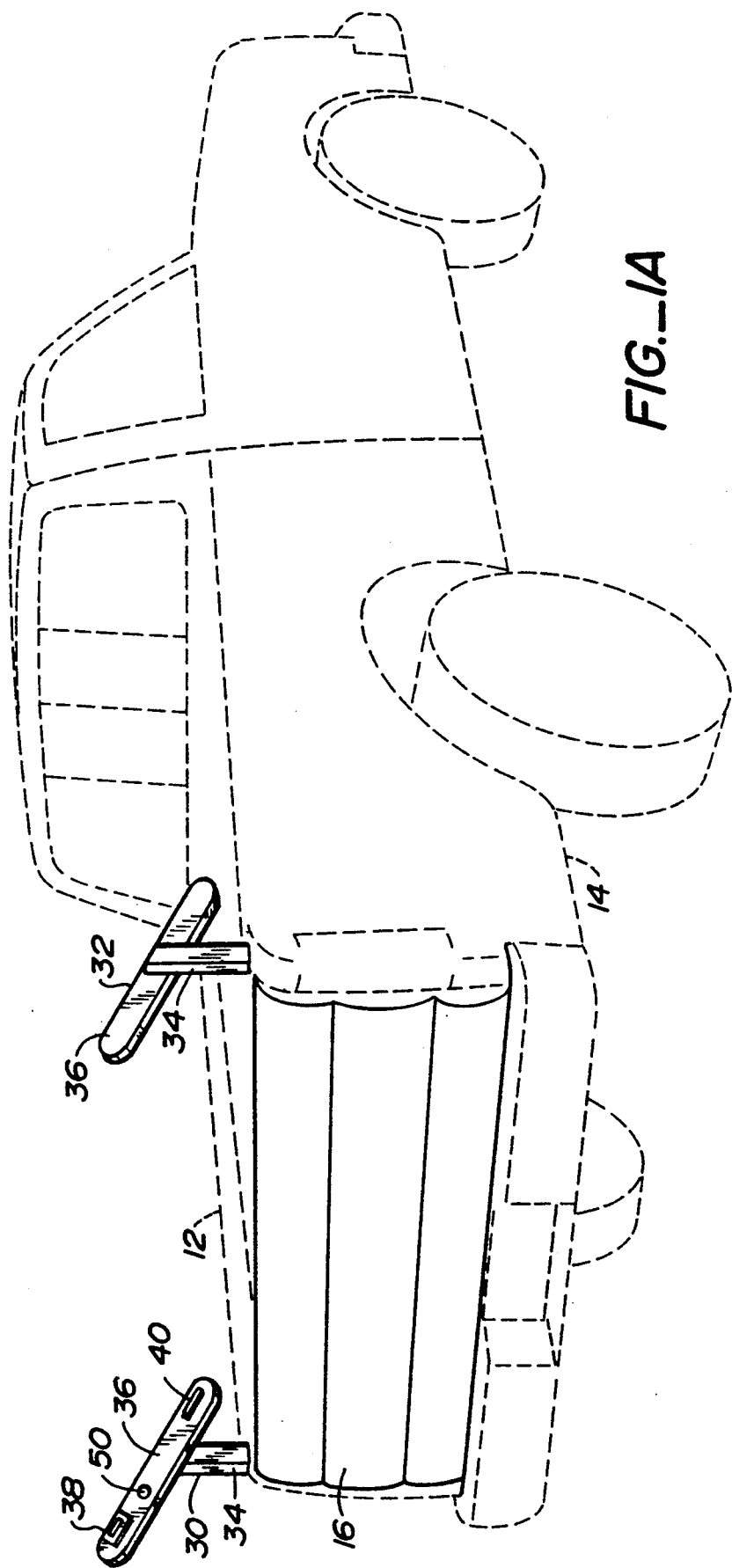

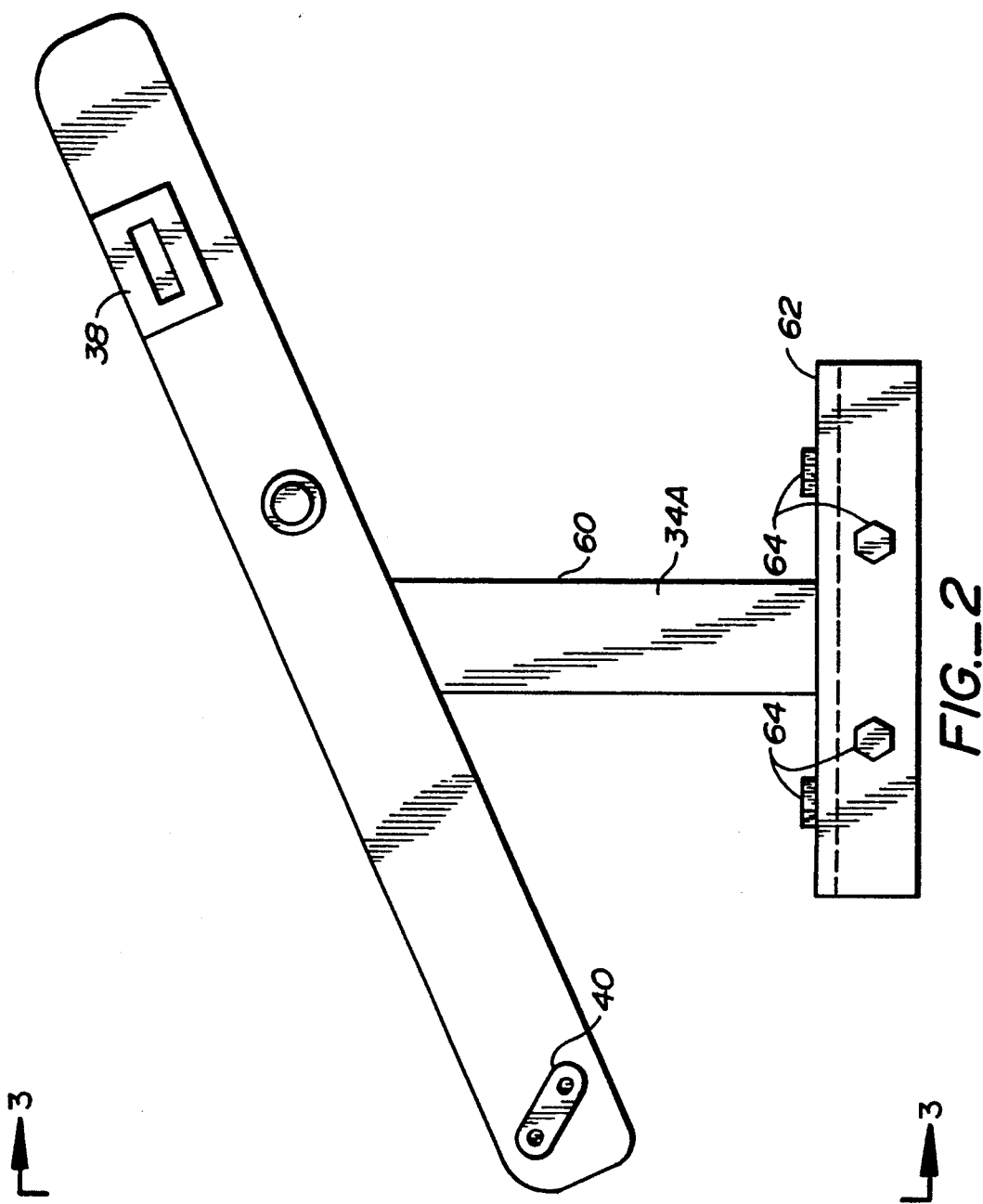
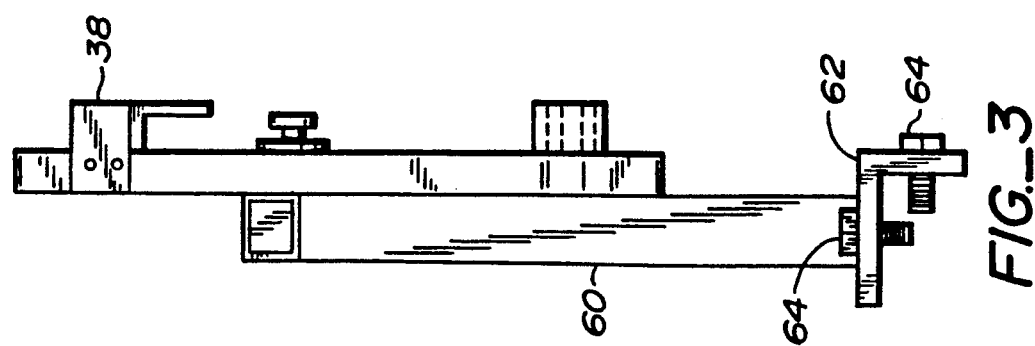

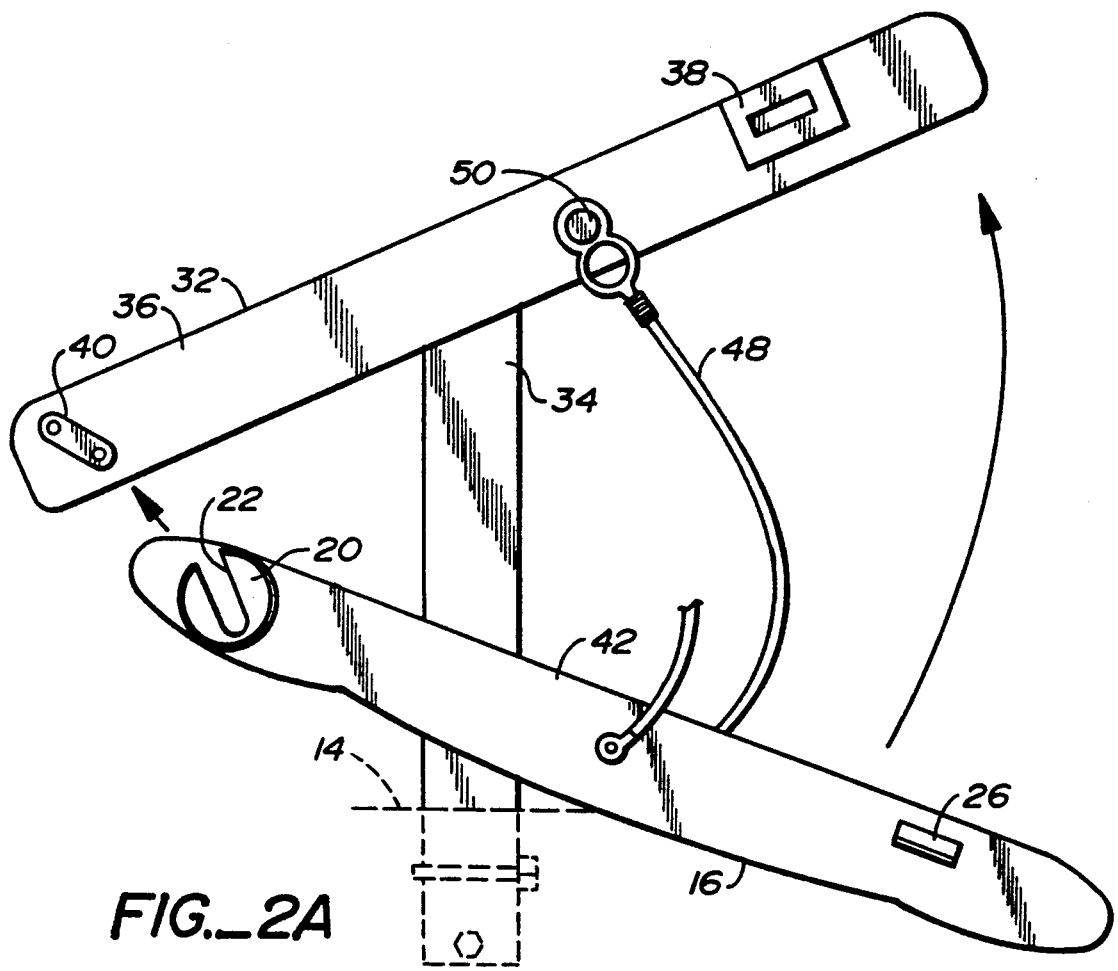
FIG._2A

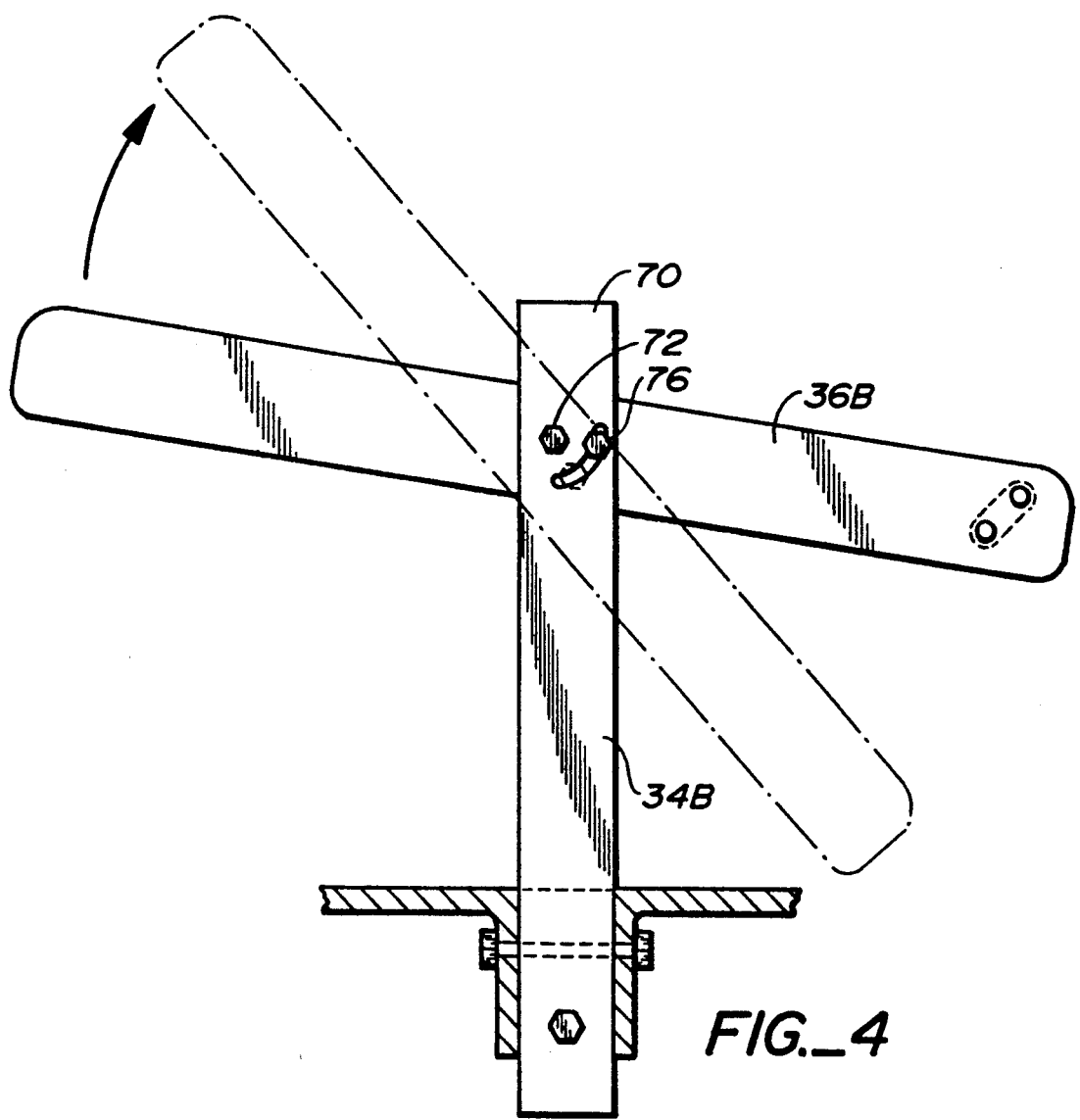
FIG._4

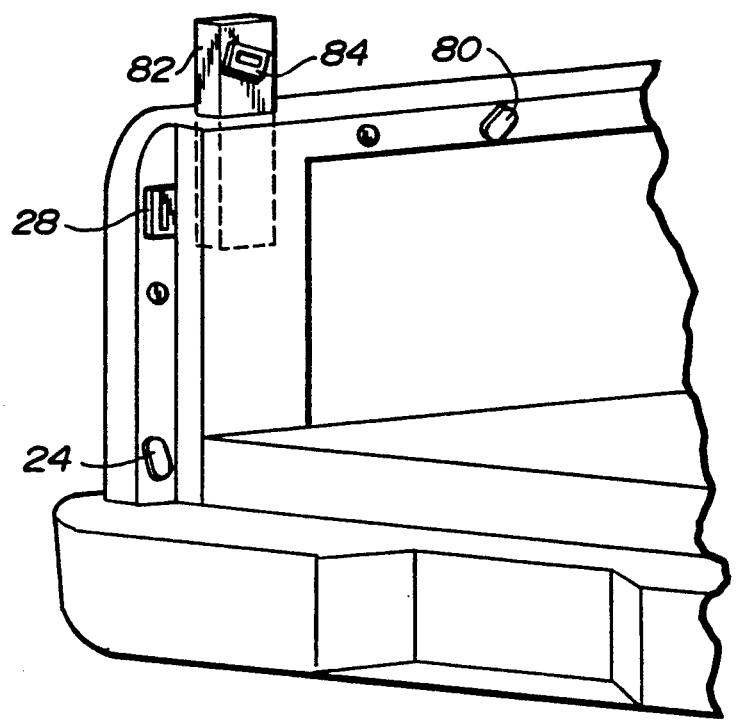
FIG._5
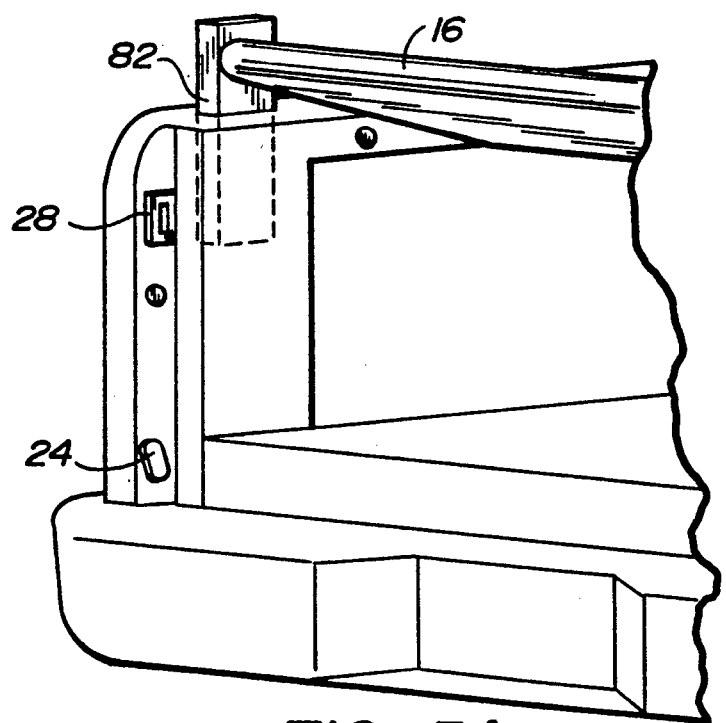
FIG._5A

TRUCK SPOILER SYSTEM

TECHNICAL FIELD

This invention relates to a spoiler system for trucks. More particularly, according to the teachings of the present invention, a tail gate operatively associated with the truck is repositioned and utilized as a spoiler affecting airflow during movement of the truck.

BACKGROUND ART

It is well known to incorporate spoilers on motor vehicles to modify airflow during operation thereof in order to provide desired effects, including increased stability during movement of the vehicle. Spoilers come in a wide range of configurations and styles and are affixed to vehicles at a variety of locations depending upon the degree and character of airflow modification desired.

The present invention is directed to pick-up trucks which conventionally incorporate tail gates. The apparatus of the present invention is related to a spoiler system which utilizes the tail gate as a spoiler component. Thus, the operator of the pick-up truck need not purchase or employ a spoiler permanently dedicated to the task. Furthermore, utilization of the tail gate as the spoiler solves the storage problem encountered when the operator wishes to remove a tail gate from the vehicle body. Utilizing the teachings of the present invention, the tail gate not only serves the desirable function of a spoiler but is also readily at hand at all times on the vehicle so that it can be reattached in its normal tail gate position on the truck body whenever desired. When a tail gate is not needed as a tail gate, the approach of the present invention permits the operator to readily relocate it on the truck so that it improves the vehicle's aerodynamics rather than impeding the smooth flow of air, the latter being an inherent characteristic of closed pick-up truck tail gates.

DISCLOSURE OF INVENTION

The present invention relates to both an apparatus and method wherein a truck tail gate is selectively employed as a spoiler for the vehicle. When so employed, the tail gate significantly adds to the stability of the vehicle. Furthermore, vehicle aerodynamics are greatly enhanced.

The apparatus of the invention is directed to a combination of structural elements including a truck having a body with a transport bed and spaced side walls extending upwardly from the transport bed Support means is connected to the truck body at a position elevated relative to the transport bed.

A tail gate is selectively alternatively positionable either at a first location wherein the tail gate is connected to the truck body adjacent to the transport bed and extends between the side walls to form an enclosure with the side walls or at a second location wherein the tail gate is supported by the support means. When in this second location the tail gate is elevated a predetermined distance relative to the transport bed and the tail gate operates as a spoiler affecting airflow during movement of the truck.

Connector means is provided for selectively alternatively removably connecting the tail gate to the truck body at the first location or to the support means at the second location.

In a preferred embodiment of the invention, the support means comprises a pair of support members releasably connected to the truck body in spaced relation to one another. The tail gate, when at the second location, extends between and is connected to the spaced support members by the connector means.

The tail gate has an outer substantially planar surface and the support members cooperate with the tail gate when the tail gate is at the second location to maintain the tail gate outer substantially planar surface at a predetermined angle relative to the transport bed. According to one mode of the invention, adjustment means is provided for selectively varying the predetermined angle.

The system of the present invention also encompasses a method of modifying the airflow characteristics of a truck having a body defining a transport bed and a tail gate connected to the truck body having an outer surface.

The method includes the step of disconnecting the tail gate from the truck body. The tail gate is then moved so that the tail gate is elevated relative to the transport bed. The tail gate is supported in such elevated location.

The elevated tail gate is positioned so that the outer surface of the tail gate is disposed at a predetermined orientation relative to the transport bed whereby the tail gate operates as a spoiler to affect the flow of air relative to the truck during movement of the truck.

Other features, advantages, and objects of the present invention will become apparent with reference to the following description and accompanying drawings.

BRIEF DESCRIPTION OF THE DRAWINGS

FIG. 1 is a rear, perspective view illustrating a pick-up truck with the tail gate thereof repositioned and utilized as a spoiler;

FIG. 1A is a view similar to FIG. 1 but illustrating the tail gate in its normal tail gate position on the truck and with support members projecting upwardly from the truck body;

FIG. 2 is an enlarged, side view of an alternative form of support member constructed in accordance with the teachings of the present invention;

FIG. 2A is an enlarged, side view of the support member of FIGS. 1, 1A and illustrating a tail gate being connected thereto whereby the tail gate will function as a spoiler;

FIG. 3 is an end view of the support member of FIG. 2, as taken in a direction of the arrows 3—3 in FIG. 2;

FIG. 4 is an enlarged, side view of another alternative form of support member, said alternative form of support member being angularly adjustable;

FIG. 5 is a partial, perspective view of a truck body in combination with yet another form of support means; and FIG. 5A is a view similar to FIG. 5 but illustrating a tail gate connected to the support means.

MODES FOR CARRYING OUT THE INVENTION

Referring now to FIGS. 1 and 1A, a pick-up truck of conventional construction is illustrated. The truck has a body including a transport bed 10 and spaced side walls 12, 14 extending upwardly from the transport bed.

As is conventional, a tail gate 16 is provided. FIG. 1A discloses the tail gate 16 in the location it normally occupies relative to the truck body. That is, the tail gate 16 extends between the side walls 12, 14 to form an enclosure with the side walls. Of course, the tail gate is conventionally hinged and mounted to enable the user to swing the gate open from the closed position illustrated in FIG. 1A, i.e., the gate swings outwardly and downwardly.

It is commonplace for pick-up truck tail gates to be selectively removable in their entirety from the truck body. That is, connector means interconnecting the tail gate to the truck body may be readily disconnected so that the tail gate can be removed, leaving the transport bed open and accessible from the rear. The connector arrangement employed in the tail gate 16 as depicted in FIG. 2A is typical. At each end of the tail gate a swivel-type fitting 20 is deployed. The two swivel-type fittings 20 (one at each end of the tail gate) define slots 22 which accommodate projections 24 (FIG. 1) disposed at the lower ends of the truck body side walls. Thus, the tail-gate 16, when employed in a conventional manner, may swivel between open and closed positions about the swivel-type fittings.

Also, conventional tail gates such as tail gate 16 include latch elements 26 at each end thereof (FIG. 2A) which cooperate with mating latch elements 28 (FIG. 1) at the truck body side walls 12, 14. Since the swivel-type fittings, projections, and latch elements just discussed are of a conventional nature and widely utilized they will not be described in detail. It will be appreciated that a suitable lock mechanism (not shown) is employed to selectively attach and detach the swivel-type fittings 20 and the projections 24.

Utilizing the teachings of the present invention, the tail gate 16 is relocated from the customary tail gate position shown in FIG. 1A to the location or position shown in FIG. 1. In this latter location the tail gate 16 operates as a spoiler affecting air flow during movement of the truck. When inclined as shown in FIG. 1, the tail gate intercepts the normal flow of air at the back of the truck. The modified air flow will exert a generally downwardly directed force on the spoiler, and thus the truck per se, to stabilize the truck during movement. Also, of course, since the tail gate is not functioning as such, it will not impede the flow of air in an undesirable manner, as is the case with closed tail gates.

In the embodiment of the invention shown in FIGS. 1, 1A, and 2A, support means is connected to the truck body at a position elevated relative to the transport bed. More particularly, the support means comprises a pair of support members 30, 32. Each support member includes a first support component 34 which is in the nature of a closed channel or post of any suitable material, such as steel. The first support components are of a size and configuration to be seated in stake holes commonly formed in the side walls 12, 14. The posts 34 may be secured in place (by means of suitable fasteners as illustrated in FIG. 2A) or simply retained in the stake holes or receptacles by gravity.

Each support member also includes a second support component 36 secured to the upper end of its associated first support component. Securement may be had by any desired expedient such as mechanical fasteners (not shown) or welding. In any event, the illustrated second support components 36 are elongated and disposed at a predetermined inclination or angle relative to transport bed 10.

Each second support component includes connectors of the type employed on the truck side walls. That is, each second support component 36 includes an inwardly facing latch element 38 of the same construction as latch element 28 on the truck side wall. Additionally, each second support component includes a projection 40 corresponding to the projection 24 on each truck body side wall. With this arrangement, the tail gate 16 may be readily interconnected with the support members 30, 32, rather than with the side walls 12, 14, whereby the tail gate will be positioned as shown in FIG. 1 and be operable as a spoiler. It will be appreciated that the tail gate 16 has at least one outer substantially planar surface 42 engaged by the air flow. Of course, the principles of the present invention are applicable to tail gates of any suitable shape.

In FIG. 1, the elevated second support components cooperate with the tail gate to maintain the tail gate outer substantially planar surface 42 at a predetermined inclination or angle relative to the transport bed.

In the embodiment of FIGS. 1, 1A, and 2A, a cable 48 is connected at its ends to a support member and the tail gate as a safety feature. Each of the second support components 36 have an inwardly projecting boss 50 for cable securement which corresponds to a boss 52 located at each of the truck body side walls.

It will be seen from the above description that the tail gate 16 may readily be relocated and utilized as a spoiler. When its use as such is no longer desired it may readily be removed from the support members 30, 32 in the same manner it was previously removed from the truck body. The tail gate may then readily be reinstalled in its normal tail gate location or position. Such flexibility is, of course, due to the fact that the connector means employed on the truck side walls are the same as those employed on the support members.

Referring now to FIGS. 2 and 3, an alternative form of support member is shown and identified by reference numeral 60. The construction of support member 60 is virtually identical to that of support members 30, 32, except that a mounting member 62 having an L-shaped cross section is secured to the bottom of the first support component 34A. Threaded fasteners 64 project through apertures formed in the mounting member and are adapted to be secured to a truck side wall. This embodiment has application to pick-up trucks which do not employ stake holes or other receptacles which may be utilized to accommodate the support member first support component.

FIG. 4 illustrates another variant of a support member, i.e. support member 70. In this embodiment of the invention, the second support component 36B may be selectively moveable relative to the first support component 34B in order to change the angle defined between the tail gate outer substantially planar surface and the transport bed. A bolt 72 extends between the first and second support components to provide pivotal attachment therebetween. A nut (not shown) cooperates with the bolt to secure support components together. Support member 34B defines a curved slot 74 through which a second bolt 76 projects. Bolt 76 is threadedly engaged with the second support component 36B. One or more of the bolts 72, 76 are tightened to secure the support components against further relative movement after the desired degree of inclination has been attained. In the FIG. 4 embodiment, other bolts are employed at the bottom of the first support component to maintain the support component at a desired location relative to its associated truck body side wall.

FIGS. 5 and 5A show yet another embodiment of the invention. In this arrangement, the tail gate 16, when functioning as a spoiler, is held in place relative to the truck body by a projection 80 affixed to and extending inwardly from a truck side wall. This projection 80, of course, corresponds to the projection 24 normally used to mount the tail gate as a tail gate. A support member 82 is mounted in the stake hole of each truck body side wall and includes a latch element 84 corresponding to latch element 28 located at each side wall.

I claim:

1. In combination:
a truck having a body including a transport bed and spaced side walls extending upwardly from said transport bed and having upper side wall ends;
support means connected to said truck body, said support means comprising a pair of support elements connected to said truck body in opposed, spaced relation to one another, each said support element having a support component spaced from an upper side wall end and elevated relative thereto;
a tail gate having opposed tail gate ends selectively alternatively positionable either at a first location wherein said tail gate is connected to said truck body closely adjacent to said transport bed and extends between said side walls with the tail gate ends connected to said side walls to form an enclosure with said side walls or at a second location wherein said tail gate extends between the support elements and is supported by said support components a predetermined distance above said transport bed and elevated relative to said upper side wall ends and spaced from said side wall ends, said tail gate operating as a spoiler affecting air flow during movement of said truck when at said second location; and
connector means for selectively alternatively removably connecting said tail gate to said truck body at said first location or to said support elements at said second location, said connector means rigidly connecting each said tailgate end to a support component at at least two spaced locations on said support component when said tail gate is at said second location.

2. The combination according to claim 1 wherein said connector means includes a swivel-type fitting and a latch element at each tail gate end.

3. The combination according to claim 1 wherein said truck body defines receptacles at said side walls, and wherein each support element is releasably positioned in one of said receptacles.

4. The combination according to claim 3 wherein said tail gate has an outer substantially planar surface and said transport bed is disposed along a plane, and wherein said support components of said support elements cooperate with said tail gate when said tail gate is at said second location to maintain said tail gate outer substantially planar surface at a predetermined inclination relative to the plane along which said transport bed is disposed.

5. The combination according to claim 4 additionally comprising adjustment means for selectively varying said predetermined inclination.

6. The combination according to claim 3 wherein said receptacles comprise stake holes formed in said side walls and said support elements include posts positionable in said receptacles.

7. The combination according to claim 1 additionally comprising safety cable means selectively interconnecting said tail gate to either said support means or said truck body.

8. The combination according to claim 1 additionally comprising mechanical fastener means for connecting said support means to said truck body.

* * * * *